US008234390B2

(12) United States Patent
Shanmugham

(10) Patent No.: US 8,234,390 B2
(45) Date of Patent: Jul. 31, 2012

(54) REGISTER CLUSTERING IN A SIP-BASED NETWORK

(75) Inventor: Saravanan Shanmugham, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/106,984

(22) Filed: May 13, 2011

(65) Prior Publication Data

US 2011/0219133 A1 Sep. 8, 2011

Related U.S. Application Data

(63) Continuation of application No. 11/828,046, filed on Jul. 25, 2007, now Pat. No. 7,970,916.

(51) Int. Cl.
*G06F 15/16* (2006.01)
*G06F 15/173* (2006.01)

(52) U.S. Cl. .................. 709/229; 709/201; 709/238

(58) Field of Classification Search .......... 709/227–229, 709/201–204, 238
See application file for complete search history.

(56) References Cited

U.S. PATENT DOCUMENTS

| | | | |
|---|---|---|---|
| 6,212,521 B1 * | 4/2001 | Minami et al. ............. 707/613 |
| 6,735,206 B1 | 5/2004 | Oki et al. |
| 6,920,454 B1 * | 7/2005 | Chan ................................. 1/1 |
| 7,110,393 B1 | 9/2006 | Tripathi et al. |
| 7,213,148 B2 | 5/2007 | Anand |
| 7,702,809 B1 | 4/2010 | Szabo et al. |
| 2002/0112008 A1 | 8/2002 | Christenson et al. |
| 2003/0126291 A1 * | 7/2003 | Wang et al. ................... 709/245 |
| 2004/0057442 A1 | 3/2004 | Westman et al. |
| 2004/0235480 A1 | 11/2004 | Rezaaifar et al. |
| 2005/0195834 A1 | 9/2005 | Kikuchi |
| 2005/0237948 A1 * | 10/2005 | Wan et al. ..................... 370/254 |
| 2005/0243740 A1 * | 11/2005 | Chen et al. .................... 370/256 |
| 2007/0140262 A1 * | 6/2007 | Wang ....................... 370/395.52 |
| 2007/0239521 A1 * | 10/2007 | Khadpe et al. .................. 705/14 |
| 2007/0253418 A1 * | 11/2007 | Shiri et al. ..................... 370/392 |
| 2008/0031258 A1 | 2/2008 | Acharya et al. |
| 2008/0046538 A1 * | 2/2008 | Susarla et al. ................ 709/217 |
| 2008/0070543 A1 * | 3/2008 | Matuszewski et al. .... 455/404.1 |
| 2008/0247381 A1 | 10/2008 | Bohm et al. |
| 2008/0291867 A1 | 11/2008 | Weniger et al. |
| 2008/0298362 A1 * | 12/2008 | Ben-Dvora et al. ........... 370/390 |
| 2008/0310302 A1 * | 12/2008 | Detwiler et al. .............. 370/230 |
| 2009/0031032 A1 | 1/2009 | Shanmugham |
| 2010/0064008 A1 | 3/2010 | Yan et al. |
| 2010/0088742 A1 * | 4/2010 | Wiryaman et al. ................ 726/1 |

OTHER PUBLICATIONS

Loo, Boon Thau, "Networking Meets Databases," CIS 700/005, Lecture 3 Slides; Spring 2007, obtained at http://www.cis.upenn.edu/~boonloo/cis700-sp07/slides/lecture3.pdf, 9 pages.
Rosenberg, J., et al., "SIP: Session Initiation Protocol," RFC 3261, Jun. 2002; obtained at http://www.ietf.org/rfc/rfc3261.txt, 170 pages.

* cited by examiner

*Primary Examiner* — Joshua Joo
(74) *Attorney, Agent, or Firm* — Patent Capital Group

(57) ABSTRACT

In one embodiment, a method can include: receiving a request for service in a first edge proxy; applying a hash function to a source address of an endpoint; and forwarding the request to a second edge proxy in response to a first result of the hash function, or servicing the request in the first edge proxy in response to a second result of the hash function.

20 Claims, 5 Drawing Sheets

REGISTER CLUSTERING IN A SIP-BASED NETWORK

RELATED APPLICATION

This application is a continuation (and claims the benefit of priority under 35 U.S.C. §120) of U.S. application Ser. No. 11/828,046, filed Jul. 25, 2007, entitled "REGISTER CLUSTERING IN A SIP-BASED NETWORK," Inventor Saravanan Shanmugham. The disclosure of the prior application is considered part of (and is incorporated by reference in) the disclosure of this application.

TECHNICAL FIELD

The present disclosure relates generally to register clustering using address or register (AOR) or user profile in a session initiation protocol (SIP) based network.

BACKGROUND

For distribution, scale, and high availability (HA) purposes, a session initiation protocol (SIP) registrar, SIP proxy, or SIP application server may be implemented as a cluster rather than as a single node. In such clusters, when a SIP REGISTER message is received, the registration information may be saved into a data store so that the information can be accessed later (e.g., for authentication or for routing a call to a registered endpoint). Conventional implementations may use a single database that is common to the nodes within the cluster.

In these conventional approaches, nodes in the cluster processing the REGISTER or INVITE messages that may need to perform a lookup can contact that single database. One drawback of this approach is that such a single database may become a bottleneck as the number of nodes in the cluster increases. Other drawbacks associated with conventional approaches include a lack of scalability, and fail-over time during node failure.

DESCRIPTION OF EXAMPLE EMBODIMENTS

Overview

Figure 1:
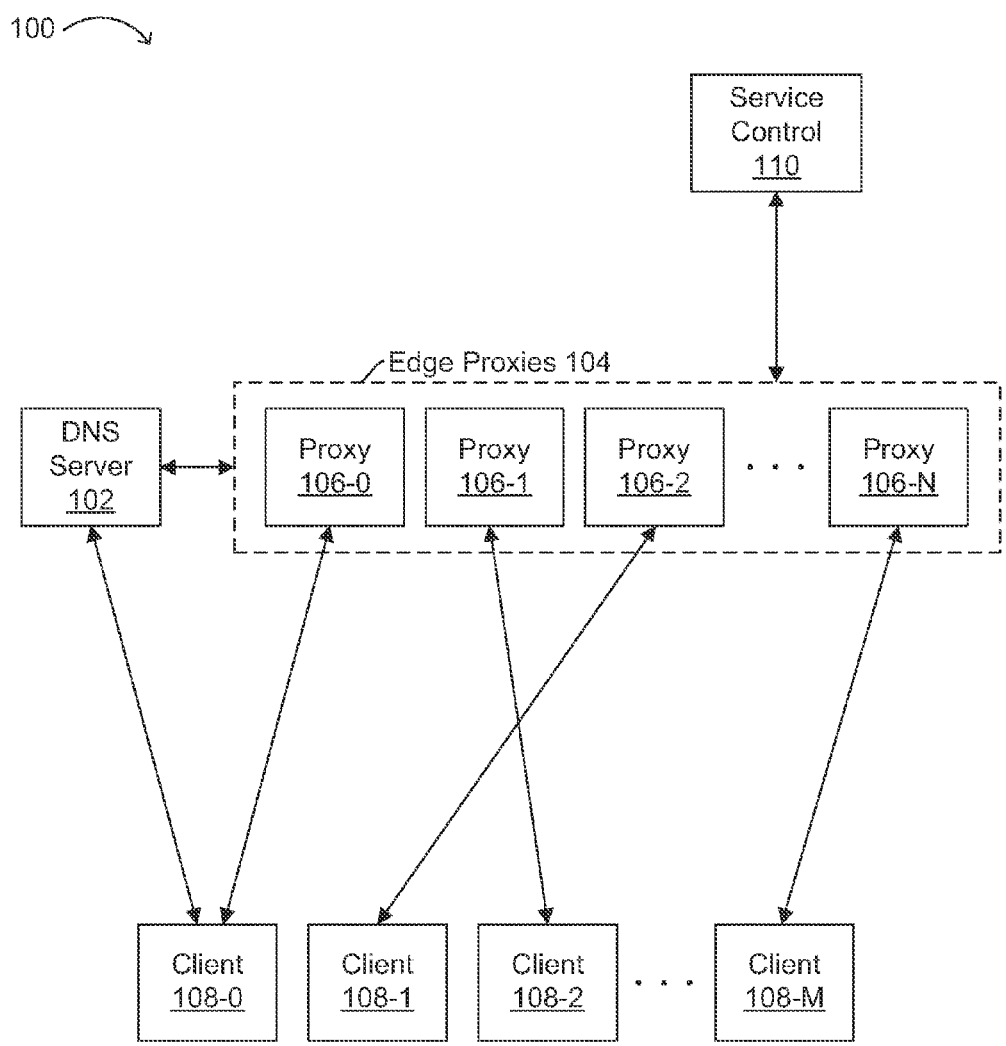
FIG. 1 illustrates an example edge network system.

In one embodiment, a method can include: receiving a request for service in a first edge proxy; applying a hash function to a source address of an endpoint; and forwarding the request to a second edge proxy in response to a first result of the hash function, or servicing the request in the first edge proxy in response to a second result of the hash function.

In one embodiment, a method can include: sending a lookup request to a domain name system (DNS) server; receiving a response from the DNS server, where the response can include a prioritized list of edge proxies for servicing a registration request; sending the registration request to a first edge proxy in the prioritized list; and receiving an acknowledgment from the first edge proxy or a second edge proxy in response to a hash function result in the first edge proxy, the hash function result being determined by hashing a source address of an endpoint sending the registration request.

In one embodiment, a first edge proxy apparatus can include: a receiver configured to receive a request for service from a source; a hash table configured to map the source of the request to the first edge proxy or a second edge proxy; and a forwarding engine configured to forward the request to the second edge proxy when a lookup of the hash table indicates the second edge proxy is mapped to the source.

Example Embodiments

In particular embodiments, a solution accommodating the scaling of clusters (e.g., arrangements of registrars, proxies, and/or servers) to relatively large sizes (e.g., in the hundreds of nodes) to support a large number of endpoints and sessions can be provided. For high availability (HA) purposes, spare capacity within the cluster to deal with node failures can also be accommodated. Session, registration, and presence state may also be "check-pointed" to backup nodes within a cluster for recovering from node failures. In particular embodiments, a central database may be eliminated as a bottleneck for soft state storage in the growth of the cluster.

In particular embodiments, the REGISTER and INVITE requests may be routed between nodes within a cluster of session initiation protocol (SIP) proxies to reach a single proxy within the cluster containing the registration information for that endpoint. This can allow each proxy to have registration data and existing call state data for only a subset of calls going through that proxy cluster. Endpoints outside of the cluster can also talk to any node within the cluster. Details of SIP can be found in IETF (Internet Engineering Task Force) RFC 3261.

In particular embodiments, a cluster may scale to very large sizes, while not being limited to the size of the database that stores the registration and call state information. In some approaches, every node in the cluster of proxy servers can share a single data store since a REGISTER/INVITE, or other requests, may go through any node in the cluster, thus necessitating local access to that data, and limiting scalability of the cluster. Thus, a central database storing registrations from an entire cluster, which is typically a scaling bottleneck, can be substantially eliminated in particular embodiments.

Referring now to FIG. 1, an example edge network system is shown and indicated by the general reference character 100. Domain name system (DNS) server 102 can interface with edge proxies 104 in an edge network structure. For example, edge proxies 104 (e.g., proxies 106-0, 106-1, 106-2, . . . 106-N) can be SIP edge proxies. Service control 110 can also interface with edge proxies 104. For example, service control 110 can include service control proxies (e.g., for billing purposes) interfacing with application servers.

Any number of endpoints or clients (e.g., clients 108-0, 108-1, 108-2, . . . 108-M) can utilize DNS server 102 and edge proxies 104 for security purposes, such as registration. For example, such clients can include any type of computing device, such as PCs, or phones, and can support voice over Internet protocol (VoIP). Generally, DNS server 102 and edge proxies 104 can be utilized for a registration function, while call invite functioning can be accommodated via a service control 110 (e.g., coupled to another phone network). For the registration function, an IP address of an endpoint or client PC/phone (e.g., 108-0) can sign up with a particular proxy (e.g., 106-0) in the edge network. The edge network can utilize authentication/authorization, or any suitable form of security, prior to sending the authenticated call for feature access (e.g., via application servers in service control 110). From service control 110, the call may pass to another network for connection.

In particular embodiments, hash functions can be utilized such that all proxy servers in an edge network have the same hash function implemented therein. Generally, a DNS lookup may be performed, and any one of the proxies (e.g., any of proxies 106-0, 106-1, 106-2, . . . 106-N) can be identified to the requesting endpoint (e.g., one of clients 108-0, 108-1, 108-2, . . . 108-M) in response to the lookup request. Further, because each of the edge proxies may be using the same hash function, one edge proxy can automatically forward a registration request to another edge proxy for servicing the registration. For example, such hashing can utilize an address on register (AOR) or other suitable assigned address of an endpoint or client, as well as a SIP address of the particular edge proxy. Further, while conventional provisioning may assign only a given edge proxy with a backup ordering to an endpoint, edge proxies in particular embodiments can forward registration messages to other edge proxies, where such forwarding determinations can result from hash functions.

Figure 2:
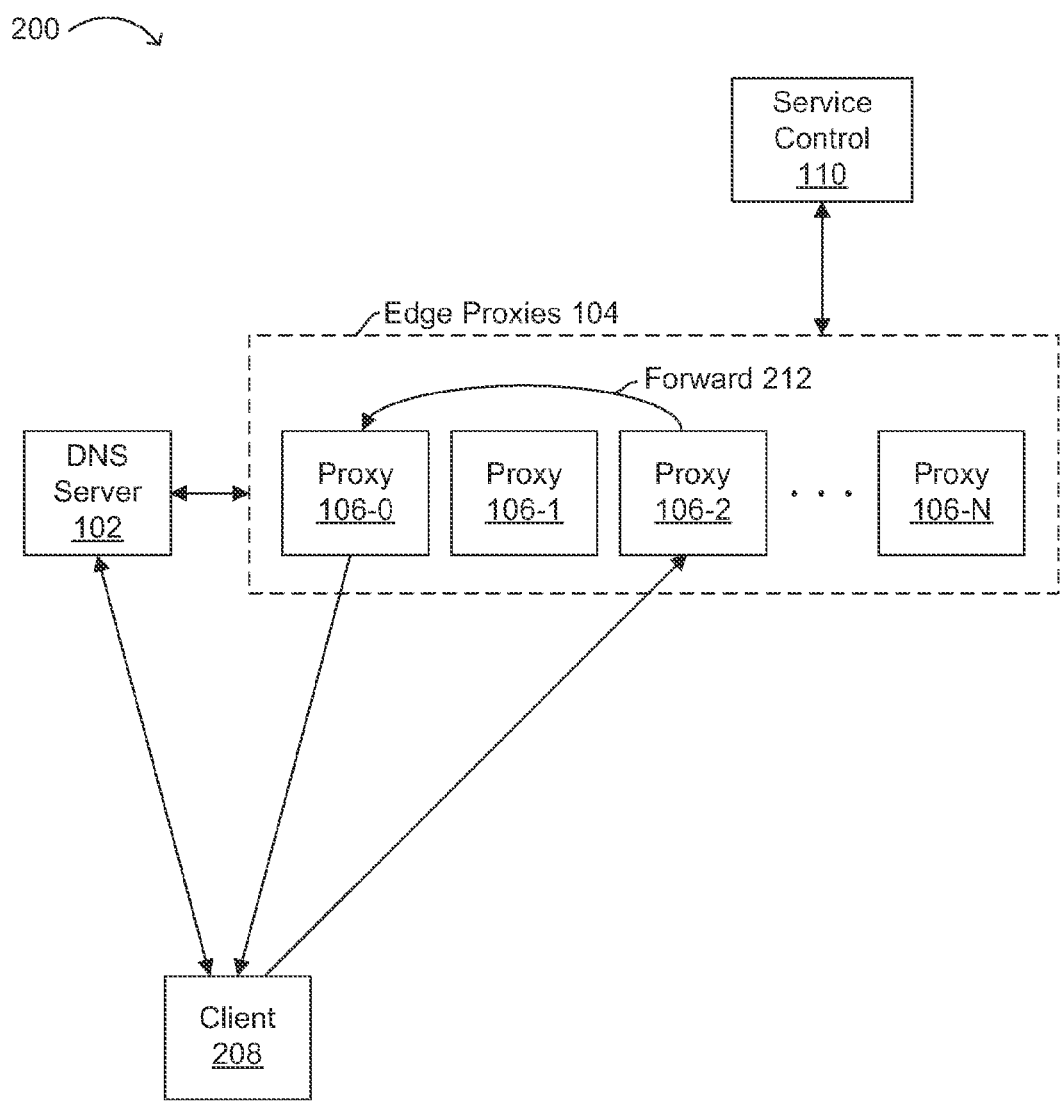
FIG. 2 illustrates an example forwarding operation in an edge network.

Referring now to FIG. 2, an example forwarding operation in an edge network is shown and indicated by the general reference character 200. In an edge network configuration, DNS server 102 can interface with edge proxies 104 (e.g., proxies 106-0, 106-1, 106-2, . . . 106-N). Also, service control 110 can provide application services (e.g., via application servers interfacing with service control proxies), and can interface with edge proxies 104.

In operation, endpoint or client 208 can provide a lookup request (e.g., an access of entries therein to determine an appropriate edge proxy) to DNS server 102. DNS server 102 can then provide to client 208 a list of edge proxies (e.g., all IP addresses of the edge proxies 106-0, 106-1, 106-2, . . . 106-N), and the registering message can be sent to any one of the edge proxies (e.g., edge proxy 106-2). Then, edge proxy 106-2 can perform a hash table lookup in particular embodiments to identify a particular node provisioned to service client 208. For example, if edge proxy 106-0 were provisioned to service client 208, but the registration request was initially sent to edge proxy 106-2, the registration request (e.g., a SIP REGISTER message) can be forwarded 212 from edge proxy 106-2 to edge proxy 106-0. In this fashion, registration can occur via edge proxy 106-0, and subsequent interaction can take place between client 208 and edge proxy 106-0.

Further, SIP INVITE messages can be sent via edge proxy 106-0 to service control 110 for making a call. In addition, return calls via a service control 110 can be processed for client 208 via proxy 106-2, then forwarded 212 to proxy 106-0 in similar fashion. Alternatively or in addition, a hash function in particular embodiments may be pushed into service control 110 such that a particular SIP proxy can be identified in advance, and the call can simply be routed from service control 110 directly to proxy 106-0 in this return call example.

Also in particular embodiments, when an edge proxy goes down, such hash functions in each edge proxy can be utilized to find the appropriate replacement edge proxy. Generally, hash tables in each edge proxy can have entries redistributed in order to remove the failed edge proxy from consideration. Thus, the hash function can be mapped to another machine or node to accommodate node failures in particular embodiments.

Figure 3:
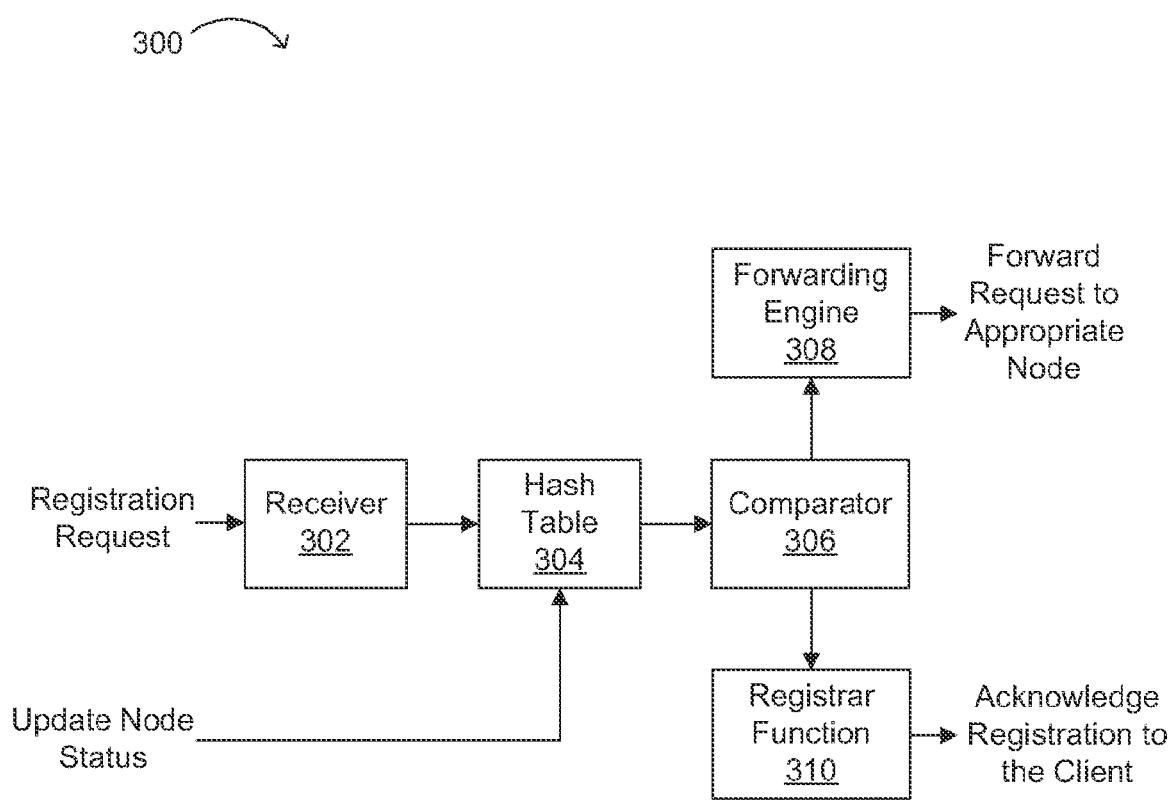
FIG. 3 illustrates example edge proxy components.

Referring now to FIG. 3, example edge proxy components are shown and indicated by the general reference character 300. Receiver 302 can receive a registration request (e.g., from an endpoint or client), and then provide to hash table 304 for lookup. Hash table 304 can also be updated (e.g., via update node status control, possibly due to node re-configuration, node failures, or other endpoint to edge proxy mapping changes, etc.) periodically, or simply when another node has failed. Once the hash table lookup result has been obtained, comparator 306 can determine (e.g., using an identification for the current node) whether the current node (e.g., an edge proxy) is appropriately provisioned to service the request. If not, forwarding engine 308 can be utilized to forward the request to the appropriate node, as determined by the hash function. However, if the current node is appropriately provisioned to service the request, registrar function 310 can perform that service and acknowledge such to the client.

In particular embodiments, because there may be no need to assign specific AOR addresses within each edge proxy, the approach may be fully scalable. Also, each edge proxy can either forward a registration request, or service that request itself, based on a lookup of a hash table included therein. Further, when an edge proxy or server goes down, each hash table in the edge network can be updated accordingly. In addition, such updating in particular embodiments can include updating hash tables for node values corresponding to the particular node that went down, whereby massive redistributing of each hash table value and/or mapping can typically be avoided. Details of such hash function are discussed further below.

Figure 4:
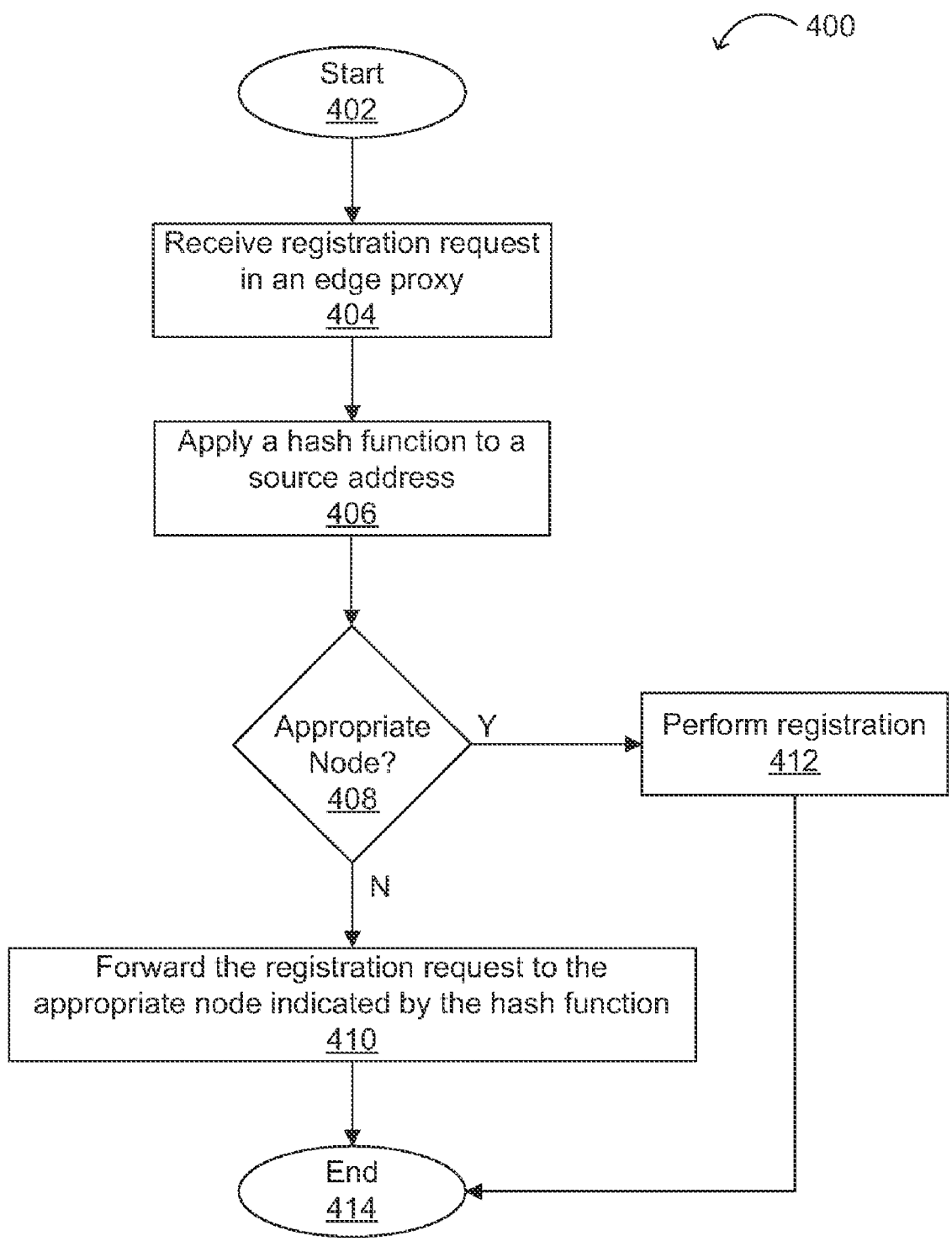
FIG. 4 illustrates a flow diagram of an example method of processing a registration request using hash functions in edge proxies.

Referring now to FIG. 4, a flow diagram of an example method of processing a registration request using hash functions in edge proxies is shown and indicated by the general reference character 400. The flow can begin (402), and a registration request can be received in an edge proxy (404). A hash function may be applied to a source address of the endpoint that sent the registration request (406). If the edge proxy is the appropriate node (408) for servicing the request, the registration can be performed (412), and the flow can complete (414). However, if the current edge proxy is not the appropriate node (408) for servicing the request, the registration request can be forwarded to the appropriate node as indicated by the hash function (410), and the flow can complete (414).

In addition, particular embodiments can support requests (e.g., an INVITE) received in an edge proxy from a service control, where the request is destined for a client to find the correct edge proxy to which the client has registered. For example, a client may be behind a network address translator (NAT), and the specific edge proxy that the client behind the NAT has registered with may be the only edge proxy that can deliver the INVITE message to the client. In this fashion, the INVITE can be delivered to the client via an appropriate edge proxy, as determined using hash functions described herein.

Figure 5:
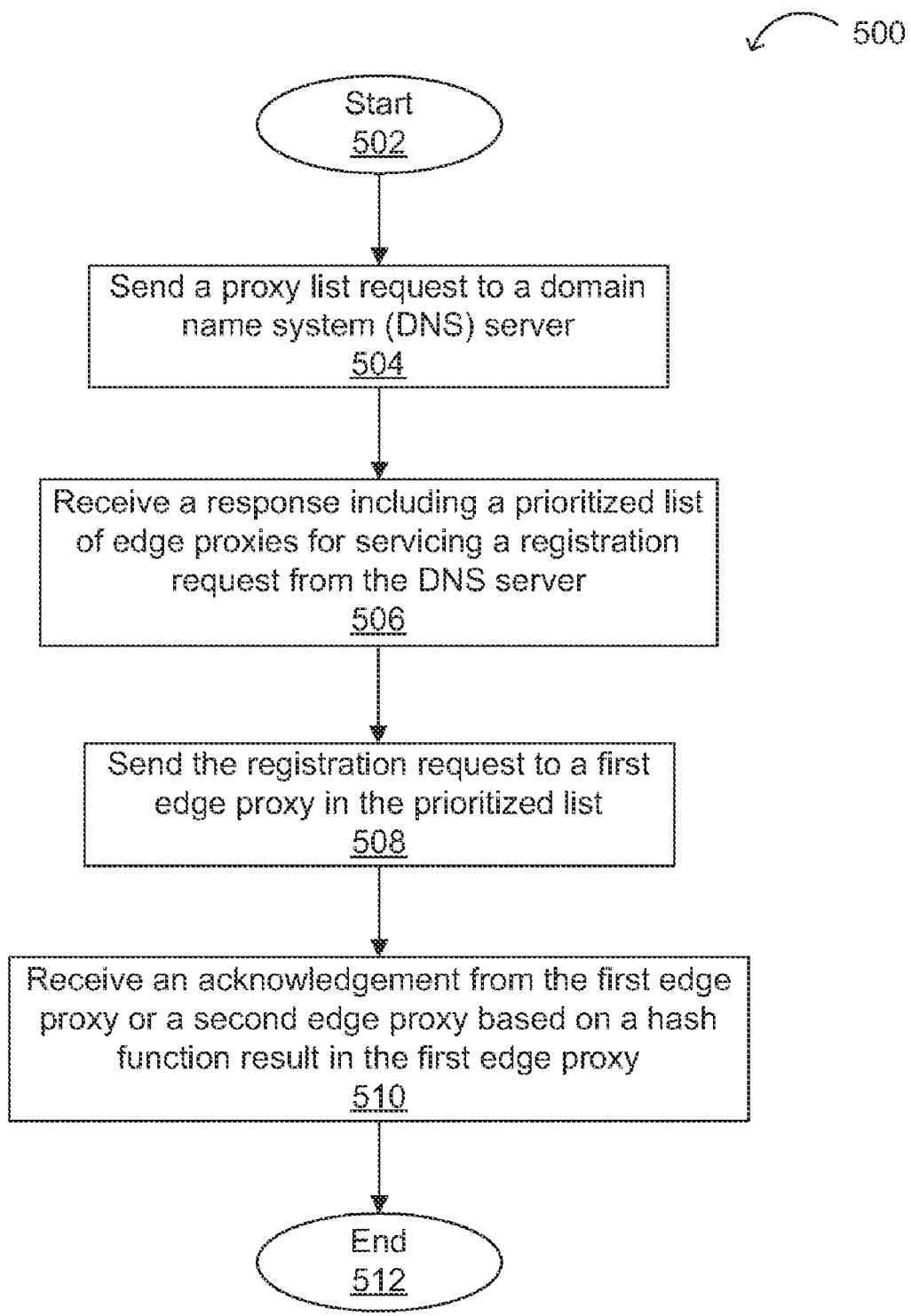
FIG. 5 illustrates a flow diagram of an example method of initiating a registration request using hash functions in edge proxies.

Referring now to FIG. 5, a flow diagram of an example method of initiating a registration request using hash functions in edge proxies is shown and indicated by the general reference character 500. The flow can begin (502), and a proxy list request or lookup can be sent to a DNS server (504). A response including a prioritized list of edge proxies for servicing a registration request can be received from the DNS server (506). For example, the list may be a randomly prioritized list. The registration request can then be sent to a first edge proxy, or any randomly chosen edge proxy, in the prioritized list (508). An acknowledgment can then be received from a first edge proxy or a second edge proxy based on a hash function result in the first edge proxy (510), and the flow can complete (512).

Thus in particular embodiments, a hash function may be applied on the address that is being registered with a SIP REGISTER message to proxy the request to a specific registrar node in a cluster of SIP registrars. Similarly, SIP INVITE and other requests from/to that address may also get hash mapped to the same node. In this fashion, the registrar that registers the SIP address can be found and routed to for messages associated with that address (see, e.g., Equation 1 below).

$$node=hash(sip\_address) \quad (1)$$

One issue requiring particular attention in design of a hashing mechanism is the addition or deletion of nodes in the registrar cluster. In a typical hash function, such as those using a basic MOD N approach, a change in N (e.g., when a node is added to or deleted from the cluster), changes most "key" mapping in the hash tables. That is, when N changes, most of the keys that were mapped to, for example node 2 in the cluster, may get reassigned, and not necessarily to the same node.

In particular embodiments, a hash function can be utilized to minimize re-assignment to a relatively low or minimum shifting of keys for maintaining a substantially even distribution of the load. Distribution of which nodes may take up which key groups can be controlled based on current load on each node in the cluster. For example, a two-level hash mapping function can be applied (see, e.g., Equation 2 below). First, a regular MOD N hash function can be applied to the key being mapped to arrive at a "bucket" ID, in the range of $0$-$B_{max}$, where $B_{max}$ may be the number of buckets, which can be a number much larger than the maximum number of nodes that can be in the cluster ($N_{max}$).

$$HK=\text{Mod } N\text{HashFunFun}(key) \quad (2)$$

In Equation 2, HK can be viewed as the bucket ID. Next, a consistent mapping function (ConsistentMapFun) can be applied to the key hash value (HK) to arrive at a node identification ($N_{id}$), as shown below in Equation 3.

$$N_{id}=\text{ConsistentNodeMap}(HK) \quad (3)$$

The function shown in Equation 3 can assign each bucket a node ID that can be the home for that bucket. When nodes are deleted, the key-to-HK mapping may not change, since $B_{max}$ has not changed. However, the number of nodes (B) currently in the cluster may have changed. Some buckets HK, and thus the keys mapped to those buckets by the function of Equation 3, that were "homed" on the dropped node may have lost their home. Thus, a new home may be found for these buckets, which can be done by adjusting how the function of Equation 3 maps bucket IDs to node IDs.

In this fashion, keys that map to those specific buckets that lost their node can get reassigned to a different $N_{id}$ value. In mapping HK (bucket ID) to $N_{id}$ (node ID) such that reassignment may be minimized, the consistent node map function may be based on a mapping table. Advantages of this approach include each node being able to sign up for as many buckets as possible, thus allowing distribution to be load-based on node capacity within the cluster. This can be important in some applications because not all nodes in the cluster may be of the same capacity.

In addition, each bucket or node may be backed up, such that registration data may be check-pointed by any different node in the cluster. Thus, when a node goes down, the backup node for that node or bucket may take over the registration duty. Further, the load may be distributed substantially evenly during a node failure. The bucket ID to node ID mapping may also be discovered dynamically by each node signing up for hosting a number of buckets. Nodes that want to apply the hash function can include such a bucket ID to node ID mapping table.

When a new node gets added, $B_{max}$ can remain the same, but the number of nodes in the cluster may have changed. The new node can then talk to nodes in a cluster one by one (e.g., in order from the heaviest load) and offer to host some of the buckets. The new node can initially act as a backup to those buckets, and once the data is current, switch to primary. This approach can allow new nodes the ability to gradually join and share network load.

Once the hash function is implemented and consistently mapping a SIP address key to a node even during failures, a system that stores registration information locally, and without needing a central database across all the nodes in the cluster, can be established. Further, if fault tolerance is required (e.g., K backups) for the registration data, only K nodes may need to share access to any single SIP address registered key in a cluster of N nodes.

For fault tolerance in particular embodiments, the bucket ID to node ID mapping table may have a primary mapping, and K secondary mappings. In this fashion, when a node fails, the hash function on any node may map a bucket ID to its backup node if the primary node is not responding. Because each bucket check-points its registration data to specific nodes acting as secondaries to those buckets, SIP sessions routed to these secondary nodes can have access to the information.

Further, when a node fails or when a node is added to the cluster, every node in the cluster can update its bucket ID to node ID mapping table. In one discovery approach, each node can individually detect that a node is down, and may mark the node as down in the mapping table. In another discovery approach, any node detecting that a node is down can announce to the rest of the cluster that the node is down.

In addition, individual nodes can pick up the load of a primary. For example, if K>0, the node that should take up the nodes that host the backups for the buckets that lost their primary can take the load and turn primary. These nodes can then talk to the cluster to request new backups to sign up for these buckets. However, if K=0, thus there are no backups, nodes that are not heavily loaded can offer to host the buckets that lost their node.

Particular embodiments can provide a technique to implement a cluster of SIP registrar or presence servers, where the cluster can grow to relatively large sizes without being limited by having a common database accessible by all nodes in the cluster for storing SIP address keys and associated registration/presence data. In particular embodiments, a two-level hashing function can be utilized to ensure specific keys (e.g., SIP addresses being registered) get mapped to specific nodes in the cluster, thus allowing for a more distributed storage of the registration information.

In particular embodiments, SIP registrar or presence server clusters can grow to relatively large sizes. Thus, a common data store for registration and presence information may not be a bottleneck. Further, particular embodiments can support fault tolerance to accommodate cases when individual nodes go down, and the associated load can be taken over by other nodes in the cluster. Further, substantially even distribution of the load among remaining nodes after a node failure can be accommodated, as well as the addition of new nodes into the cluster.

Although the description has been described with respect to particular embodiments thereof, these particular embodiments are merely illustrative, and not restrictive. For example, while SIP REGISTER and INVITE messages have been discussed herein, other types of messages and/or protocols can be accommodated in particular embodiments. Also, while particular network arrangements, such as edge networks with SIP proxies and hash functions have been described herein, particular embodiments can utilize any suitable network structure and/or hash functions. For example, particular embodiments are suitable to clusters of presence servers as well.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

What is claimed is:

1. A method, comprising:
   identifying, using at least one processor device, a change to a first plurality of proxies resulting in a different second plurality of proxies, each proxy in the first plurality mapped to one or more respective hash keys of a particular hashing function according to a first mapping, the particular hashing function hashing source addresses corresponding to requests in a particular session initiation protocol (SIP) network to generate a corresponding hash key;
   remapping the first mapping to accommodate for the change to the first plurality of proxies to generate a second mapping different from the first mapping, wherein at least one of the respective hash keys of the particular hashing function is mapped to a particular proxy included in the first plurality of proxies in the first mapping and mapped to a different, second proxy included in the second plurality of proxies in the second mapping;
   receiving a particular request at a first proxy in the second plurality proxies following the remapping;
   applying the particular hashing function to a particular source address associated with an endpoint that sent the request to identify a particular hash key corresponding the particular source address;
   determining, from the second mapping, whether the first proxy in the second plurality of proxies is provisioned for servicing the request; and
   forwarding the request to a second proxy based on a result of the particular hashing function.

2. The method of claim 1, wherein applying the particular hashing function includes evaluating second mapping includes a hash table that includes a plurality of proxies for servicing particular endpoint requests.

3. The method of claim 2, wherein the particular hashing function is provided in a service control such that a particular one of the second plurality of proxies is identified in advance of servicing a particular request.

4. The method of claim 1, wherein the particular hashing function is provisioned in both the first proxy and the second proxy such that each of the first and second proxies can automatically forward incoming registration requests to each other.

5. The method of claim 1, wherein the particular hashing function utilizes an address on register (AOR).

6. The method of claim 1, wherein the request is associated with a session initiation protocol (SIP) INVITE, or a SIP REGISTER.

7. The method of claim 1, wherein the particular hashing function considers a network address translator (NAT) parameter in determining which proxy should service the request.

8. The method of claim 1, wherein key groups are defined within the second mapping for each proxy in the second plurality of proxies and-based, at least, on a current load across the second plurality of proxies.

9. The method of claim 1, wherein the change to the first plurality of proxies includes removal of at least one particular proxy from the first plurality of proxies, and remapping the first mapping to generate a second mapping includes reassigning each hash key in a particular grouping of hash keys mapped to the removed particular proxy to other proxies included in the second plurality of proxies.

10. The method of claim 9, wherein a proxy failure is determined such that the particular proxy is removed based on the proxy failure.

11. The method of claim 9, wherein the first mapping includes, for each hash key in the particular grouping, an assignment of at least one secondary proxy and each hash key in the particular grouping of hash keys is reassigned to a corresponding assigned secondary proxy.

12. The method of claim 11, wherein each hash key in the particular grouping includes an assignment of at least two secondary proxies and the corresponding hash key is reassigned to the secondary proxy with a lower load.

13. The method of claim 9, wherein the change to the first plurality of proxies includes addition of at least one new proxy to the first plurality of proxies, and remapping the first mapping includes causing at least one hash key to be mapped to the new proxy.

14. The method of claim 13, wherein hash keys are attempted to be reassigned to the new proxy from a proxy, included in the first plurality of proxies, that has a highest load within the first plurality of proxies before reassigning hash keys mapped to other proxies in the first plurality of proxies.

15. The method of claim 14, wherein the change to the first plurality of proxies is identified at each of the first plurality of proxies.

16. The method of claim 1, wherein each proxy in the first plurality of proxies included a copy of the first mapping and copies of the second mapping are generated at each of the second plurality of proxies.

17. Logic encoded in non-transitory tangible media that includes code for execution and when executed by a processor operable to perform operations comprising:
   identifying, using at least one processor device, a change to a first plurality of proxies resulting in a different second plurality of proxies, each proxy in the first plurality mapped to one or more respective hash keys of a particular hashing function according to a first mapping, the particular hashing function hashing source addresses corresponding to requests in a particular session initiation protocol (SIP) network to generate a corresponding hash key;
   remapping the first mapping to accommodate for the change to the first plurality of proxies to generate a second mapping different from the first mapping, wherein at least one of the respective hash keys of the particular hashing function is mapped to a particular proxy included in the first plurality of proxies in the first mapping and mapped to a different, second proxy included in the second plurality of proxies in the second mapping;
   receiving a particular request at a first proxy in the second plurality of proxies following the remapping;
   applying the particular hashing function to a particular source address associated with an endpoint that sent the request to identify a particular hash key corresponding the particular source address;
   determining, from the second mapping, whether the first proxy in the second plurality of proxies is provisioned for servicing the request; and forwarding the request to a second proxy based on a result of the particular hashing function.

18. The logic of claim 17, wherein the change to the first plurality of proxies is triggered by a proxy failure and a hash table provisioned in the first proxy includes the first mapping and is updated to remove an entry associated with the proxy failure.

19. An apparatus, comprising:
a processor;
a hash table; and
a forwarding engine configured for forwarding information in a network environment, wherein the processor, the hash table, and the forwarding engine interact such that the apparatus is configured for:
  identifying, using at least one processor device, a change to a first plurality of proxies resulting in a different second plurality of proxies, each proxy in the first plurality mapped to one or more respective hash keys of a particular hashing function according to a first mapping, the particular hashing function hashing source addresses corresponding to requests in a particular session initiation protocol (SIP) network to generate a corresponding hash key;
  remapping the first mapping to accommodate for the change to the first plurality of proxies to generate a second mapping different from the first mapping, wherein at least one of the respective hash keys of the particular hashing function is mapped to a particular proxy included in the first plurality of proxies in the first mapping and mapped to a different, second proxy included in the second plurality of proxies in the second mapping;
  receiving a particular request at a first proxy in the second plurality of proxies following the remapping;
  applying the particular hashing function to a particular source address associated with an endpoint that sent the request to identify a particular hash key corresponding the particular source address;
  determining, from the second mapping, whether the first proxy in the second plurality of proxies is provisioned for servicing the request; and
  forwarding the request to a second proxy based on a result of the particular hashing function.

20. The apparatus of claim 19, wherein applying the particular hashing function includes evaluating the hash table, which includes a plurality of proxies for servicing particular endpoint requests, and wherein the particular hashing function is provided in a service control such that a particular one of the second plurality of proxies is identified in advance of servicing a particular request.

* * * * *